United States Patent [19]
Benson

[11] 3,772,540
[45] Nov. 13, 1973

[54] ELECTROMECHANICAL LATCHING ACTUATOR

[75] Inventor: Glendon M. Benson, Danville, Calif.

[73] Assignee: New Process Industries, Inc., Minneapolis, Minn.

[22] Filed: July 19, 1972

[21] Appl. No.: 273,062

[52] U.S. Cl. .................. 310/14, 310/30, 310/34
[51] Int. Cl. ............................................. H02k 41/00
[58] Field of Search .................. 310/12, 13, 14, 24, 310/30, 34, 36, 38, 156

[56] References Cited
UNITED STATES PATENTS
3,022,450   2/1962   Chase, Jr. ..................... 310/30 X
3,119,940   1/1964   Pettit et al. ....................... 310/24

*Primary Examiner*—Gerald Goldberg
*Attorney*—Stephen S. Townsend et al.

[57] ABSTRACT

An electromechanical latching actuator for producing linear or rotary motion. The device includes one or more sets of permanent magnets and electric coils which annul and flux switch a magnetic field between adjacent magnetic poles thereby sequentially generating a force or torque that can be coupled to a suitable load. A fluid valve coupled to such actuator.

16 Claims, 16 Drawing Figures

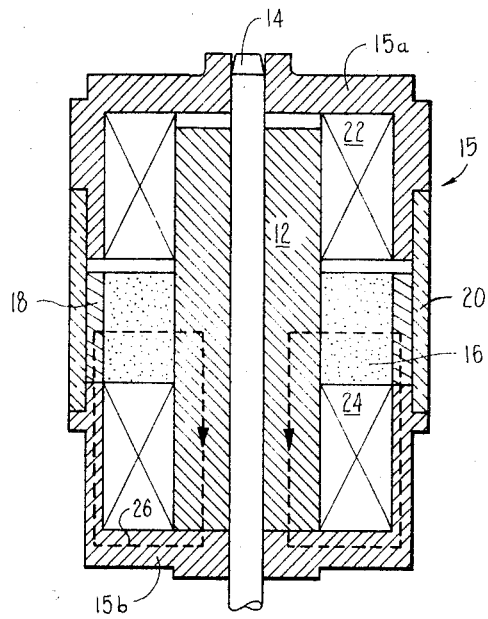
FIG. IA.
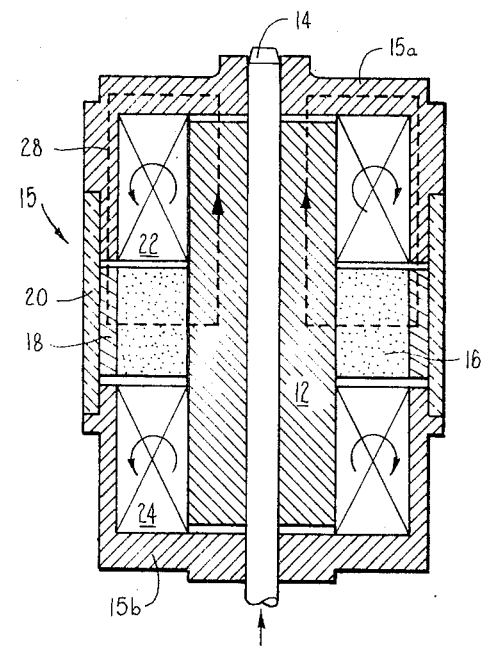
FIG. IB.
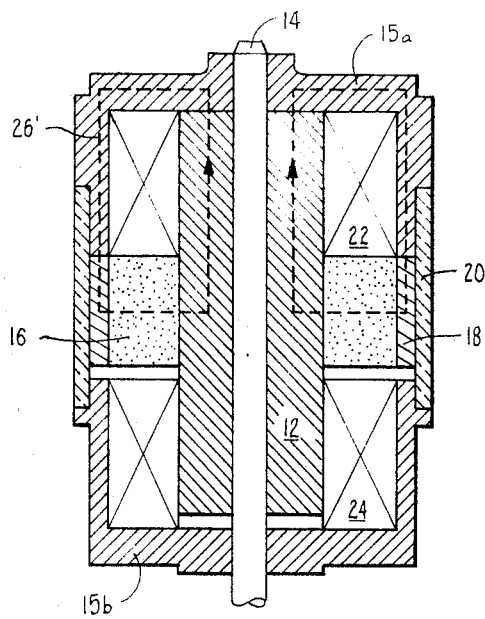
FIG. IC.
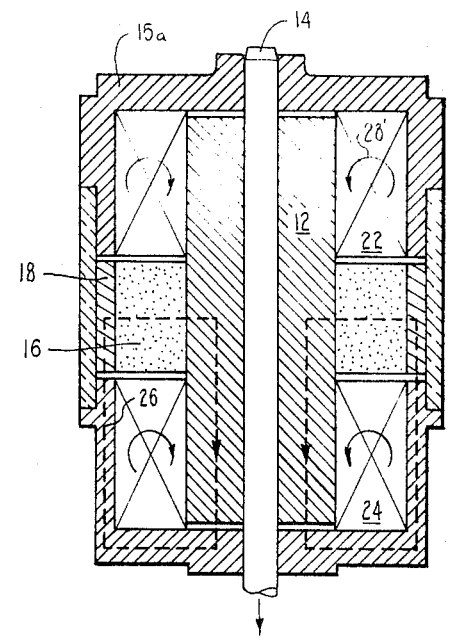
FIG. ID.

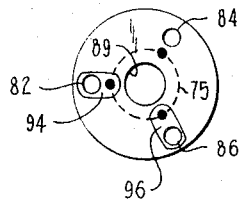
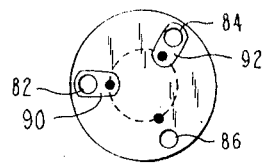
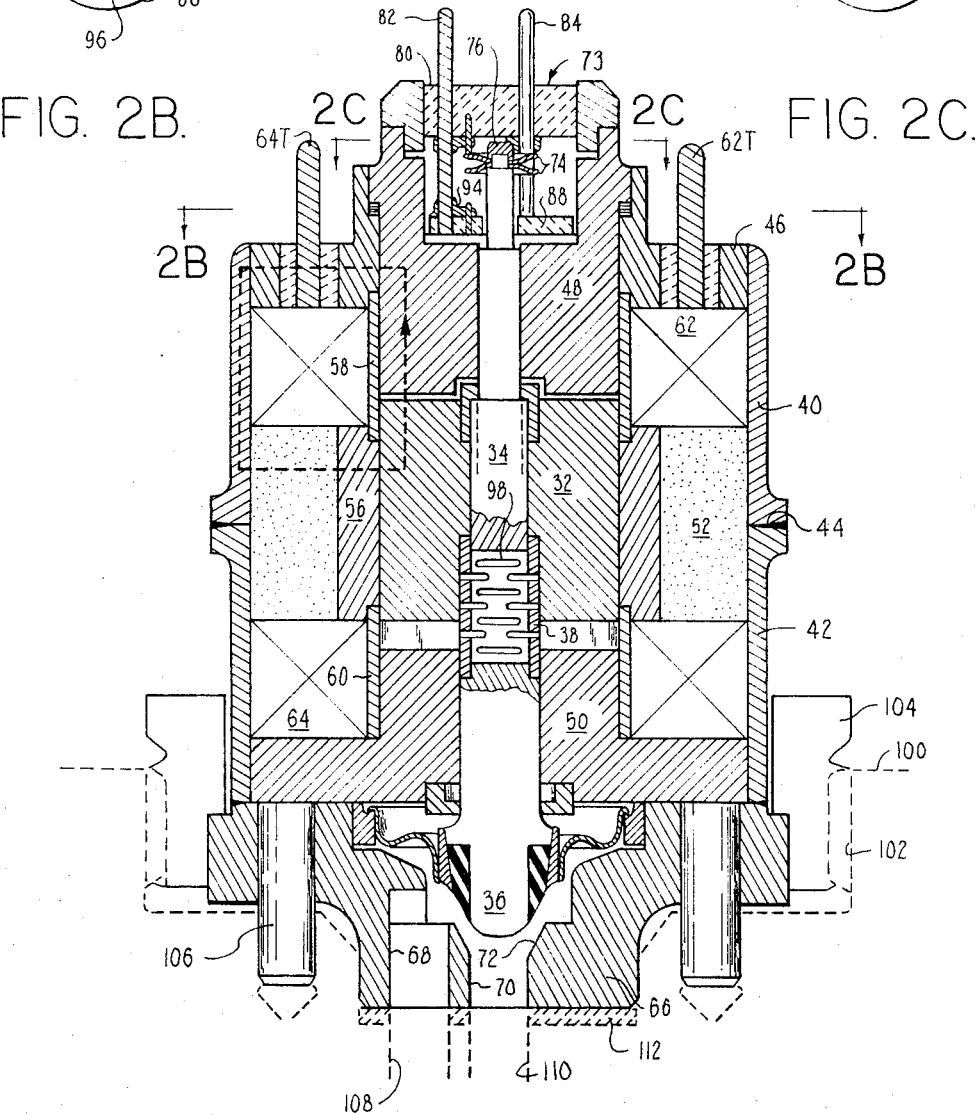
FIG. 2B.  FIG. 2C.
FIG. 2.

ELECTROMECHANICAL LATCHING ACTUATOR

This invention relates to apparatus that sequentially generates a latching or a driving force or torque by switching or nullifying the magnetic flux generated by perpendicularly poled permanent magnets by meanS of reversing the magnetizing force generated by one or more electric coils.

In process and machine control systems it is often beneficial to produce a torque or force in discrete steps wit non-mechanical latching between each step. It is further desirable to produce a given torque or force with a most compact, lightweight mechanism, having fast response, high efficiency and positional accuracy and in addition a deivce that is passive during latching. It is further desirable that such Mechanism be bi-stable for digital control and not employ moving electric coils which require brushes and flexible conductors to effect connection to the coils. The present invention meets these requirements and can be varied in configuration and function to match a wide range of output requirements.

Broadly stated the present invention relates to an actuator or stepping motor that produces bi-directional forcing and latching by a perpendicularly poled permanent magnet that functions without polarity switching and produces bi-directional movement in cooperaton with electrical coils that are pulsed with alternating polarity.

These coils switch and augment the magnetic flux generated by the permanent magnet between opposite air-gaps in which a mechanical force is generated by the flux at these air-gaps. Since the effective air-gap length changes during movement, the reluctance of each magnetic circuit changes, and as a result these actuators or stepping motors may be classed as latching, variable reluctance, multiple-pole types with perpendicularly poled permanent magnets.

The principal fetures of this invention include: (1) bi-stable operation (the actuator remains position locked at each increment of movement with magnetic flux acting as the holding force); (2) bi-directional operation (the acutator has force symmetry for moving and latching, requiring only reversal of voltage polarity to effect movement); (3) passive latching (no electrical power is consumed for position holding), (4) squarewave force response (the actuator can develop a constant force throughout the displacement which equals the latching force, and the latching force can be made independent of air-gap length over a prescribed air-gap range owing to magnetic core saturation; (5) high force capability (the actuator can develop up to 24 kilogauss flux across an air-gap during latching and moving, corresponding to a mechanical unit force of 332 pounds per square inch of air-gap face cross-sectional area); and (6) flexibility of design (permits the use of a range of permanent magnet materials and coil geometries, including both wire and tape wound, which permits tailoring the actuator to meet cost, performance, and electrical requirements).

Examples of design flexibility include: (1) for low cost and performance the use of ceramic permanent magnets and ingot iron or silicon steel magnetic cores and tape wound coils; (2) for intermediate cost and performance the use of Alnico 8 permanent magnets and silicon steel magnetic cores and tape wound coils; and (3) for high cost and performance the use of rare earth cobalt permanent magnets and Supermendur magnetic cores and wire wound insulation encapsulated coils. Each of these design examples is capable of saturating the magnetic core at the air-gap pole faces since the magnetic area of the permanent magnet is considerably larger than at the poles or in the connecting magnetic circuit.

Another aspect of the present invention is directed to a latching linear or rotary actuator that produces bi-directional forcing and passive latching by a perpendicularly poled permanent magnet having a short magnetic length and a large magnetic area that functions without polarity switching and produces bi-directional movement by electrical coils that are pulse energized with alternating polarity. These coils switch and augment the magnetic flux generated by the permanent magnet between parallel magnetic circuits in which a mechanical force is generated on a movable element and subsequently applied to movable valving elements of fluid control devices for the control of fluid flow. The present invention provides high forces generated by the high flux densitites produced by the permanent magnet configuration which minimizes current and electrical power requirements and simplifies the control logic required.

The foregoing, together with other objects, features and advantages of the present invention will become more apparent after referring to the following specification and accompanying drawings in which:

FIGS. 1A–1D depict an embodiment of the invention in various states of operation thereof;

FIG. 2 is an elevation view in cross-section of an embodiment of the present invention employed for driving a fluid valve;

FIG. 2B is a fragmentary cross-sectional view taken along line B—B of FIG. 2;

FIG. 2C is a fragmentary cross-sectional view taken along line C—C of FIG. 2;

Figure 2A:
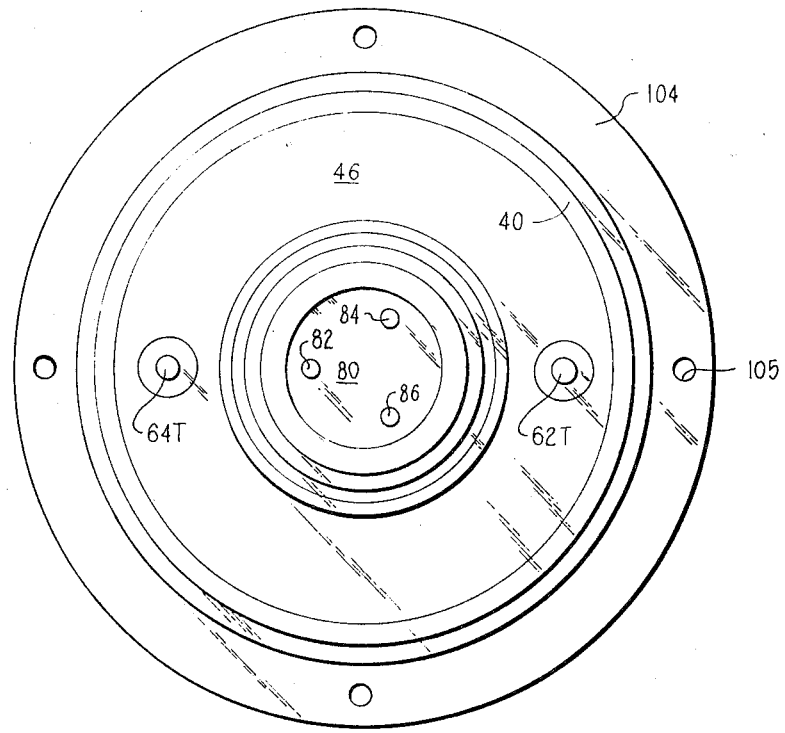
FIG. 2A is a top view of the device of FIG. 2.

Referring more particularly to the drawings and specifically FIGS. 1A–1D, reference numeral 12 indicates a magnetic plunger which is attached to an actuator rod 14. The actuator rod is supported for reciprocal movement in housing 15 composed of magnetic housing segments or core cups 15A and 15B. Also attached to magnetic plunger 12 is a permanent magnet 16 of annular form and a magnetic tube 18 which is also annular and circumscribes permanent magent 16. Housing segments 15A and 15B are retained in the position shown in the drawings by a non-magnetic shell 20. The non-magnetic shell isolates housing segments 15A and 15B from one another. Rigidly mounted within housing 15 is a first coil 22 and a second coil 24. Coil 22 circumscribes the upper end of magnetic plunger 12 and coil 24 circumscribes the lower end of the magnetic plunger. Suitable terminals for the coils extend through housing members 15A and 15B in a conventional manner and are therefore not shown specifically in the drawings. Permanent magnet 16 is radially poled, by which is meant that one magnetic pole (e.g., North) is on the inner cylindric surface of the permanent magnet and the other pole (e.g., South) is on the outer cylindric surface so that the path of flux produced by the magnet is as shown by broken lines 26 in FIG. 1A.

In the configuration shown in FIG. 1 the load, attached to the lower end of the rod, is not shown. Alternately, the load could be attached to the upper end or both ends of the rod, or to the plunger itself. In FIG. 1A the actuator is shown in the stable lower latched position. In this position the load absorbs the latching force of the actuator and a small air-gap exists between the pole faces to accommodate any axial deformation of the load without the pole faces bottoming out. The latching is produced by the magnetic field (shown by the dashed lines 26 in FIG. 1A) generated by the radially poled permanent magnet 16 located in the plunger. The magnetic field is confined primarily to the lower magnetic circuit, as shown, since the reluctance of the two upper air-gaps (between plunger and upper core) is large relative to the reluctance of the two lower air gaps. Magentic flux densities of 24 KG have been obtained in the air-gaps (pole faces) in this latching position. These flux densities are high enough to saturate even advanced alloy cores. As a result of saturation, the latching force is nearly independent of lower air-gap clearance variations introduced by manufacturing tolerances. As a result, the permanent magnet acts as a very strong spring which holds the integral plunger and actuator rod in the down position. The relatively large diameter-to-length ratio of the plunger provides large stiffness which minimizes plunger flexure. The actuator rod-ends can be lapped to sleeved bores of the core to provide precise alignment and guidance and minimize friction.

The operation of the invention can be appreciated by following the sequence of positions depicted in FIGS. 1A-1D. In FIG. 1A with coils 22 and 24 disconnected from any power source, the movable member of the device composed of magnetic plunger 12, actuator rod 14, permanent magnet 16 and magnetic sleeve 18 resides in the lower position, shown in FIG. 1A. The movable member is there retained because of the latching flux path designated by broken lines 26. To switch or shift the movable member upward to the opposite end of the casing a current pulse is delivered to coils 22 and 24 which coils are typically series connected. The current pulse, generated for example by discharging a capacitor through an SCR, produces a magnetic field in upper core 15A and the upper part of plunger 12 as shown by the arrows in FIG. 1B and identified by reference numeral 28.

This magnetic filed has the same direction as the magentic field produced by permanent magnet 16 and consequently reinforces the magnetic field in the upper portion of plunger 12. The current pulse in lower coil 24 produces a magnetic field in the lower portion of plunger 12 which, as shown by the arrows in FIG. 1B, opposes the magnetic field produced by permanent magnet 16 and nulls the magnetic field in the air-gap between plunger 12 and lower housing member 15B. As a result no magnetic field exists at the latter air gap while the air gap between plunger 12 and housing member 15A has a magnetic field density that is limited only by the saturation characteristic of the plunger. The area of the movable portions of the structure is approximately one half the total half cross sectional area of the actuator, with one half of the pole area located between sleeve 18 and the housing and the other half between plunger 12 and the inner surfaces of the housing member 15A or 15B. In order to achieve high flux densities at these air gap faces, the magnetic circuit has a nearly uniform cross-sectional area throughout its magnetic length, the separation distance between the inner and outer gaps is maximized, and the length to diameter ratio of the magnetic housing segments 15A and 15B are less than unity. This length to diameter ratio is achieved by providing coils 22 and 24 that are larger in a radial direction than they are in an axial direction.

The combination of a large core face or air-gap area and a high flux density, produced by both the coil and the permanent magnet, leads to a high force actuator. The nulling of the magnetic "spring" force by energization of coil 24 increases the force available for moving plunger 12 and the parts attached thereto. The nulling effect, which flux switches the permanent magnet flux in actuator 12, is sufficient to move the armature assembly without energizing coils 22 although energization of the latter coil produces a faster acting movement of rod 12 and the load that is attached thereto.

As the armature moves upward as shown in FIG. 1B, the magnetic field produced by the permanent magnet increases in the upper air-gap due to the decrease in the air-gap and the consequent decrease in reluctance of the upper magnetic circuit. As the plunger 12 latches in the upper position that portion of the magnetic energy which is produced by the coils can be recovered by resonant charging of a capacitor in an analogous manner to that of an LC resonant electric circuit. As a result the only appreciable electrical energy loss is that due to coil resistance. (The loss due to magnetic hysteresis and eddy currents is negligible due to the design of plunger 12, sleeve 18 and housing members 15A and 15B and the method of operation.) The remaining electrical energy is either converted to mechanical work (available at actuator rod 14) or recovered by recharging a suitable low pass capacitor (not shown). Upon completing the actuation cycle power is disconnected from coils 22 and 24 and the actuator is passive, i.e., the plunger is latched in a position shown in FIG. 1C by the magnetic flux path indicated in such figure by the broken lines 26'. The latching force is provided solely by the magnetic field produced in the upper air-gaps by the permanent magnet. The magnetic field in the lower air-gaps is negligible due to much larger reluctance caused by these longer air-gaps. Since the mechanical force produce by a magnetic field is proportional to the square of the field density, the downward force is insignificant. The magnetic flux shown by lines 26' in FIG. 1C is essentially confined to the upper housing member 15A, the plunger 12 and the sleeve 18 and the flux direction through the permanent magnet 16 is the same as that shown in FIG. 1A. As a result, the polarity of the permanent magnet is not switched in going from one latched position to the other and therefore the hysteresis loss and any demagnetizing effects in the permanent magnet are minimized or virtually eliminated.

To move the plunger from the upper latched position of FIG. 1C, a current pulse is again supplied to coils 22 and 24. The direction of the current is opposite from that referred to above in connection with FIG. 1B and is indicated by arrows 28' in FIG. 1D. The current in coil 22 creates a field in plunger 12 that bucks or nulls the flux resulting from the presence of permanent magnet 16. The current in coil 24 generates a magnetic field in the lower air-gaps which reinforces or adds to the field produced by permanent magnet 16. As a result the "spring" force produced by the permanent magnet is nulled and the entire force produced by the magnetic flux at the lower air-gap is available at actuator rod 14 and the load attached thereto. The magnetic flux at the lower air-gaps is sufficient to saturate the lower portion of plunger 12 and lower housing magnetic member 15B. This force drives the actuator rod 14, plunger 12, permanent magnet 16 and sleeve 18 downward. The magnetic energy may again be recovered through resonant charging of a capacitor and the system has returned to its latched position shown in FIG. 1A.

The embodiment of the invention shown in FIG. 1 can be designed such that the maximum energy product of the permanent magnet is attained at the lower latched position. Under actuation the coil which reinforces the flux increases the magnetization level of the permanent magnet. As a result the magnetic field produced by the reinforcing coil (e.g., coil 24 in FIG. 1D) contributes on the average about one half of the total flux while the permanent magnet contributes the other half. Due to this flux switching operation the permanent magnet is not degraded in operation as is the case in devices operated in flux opposition, but the permanent magnet retains its high stability toward temperature and radiation effects.

The embodiment shown in FIG. 1 permits the use of a range of permanent magnetic materials and coil sizes which allows tailoring the design to meet the cost and performance requirements. This flexibility in design is due to three factors. One, the permanent magnet is never operated much below its maximum energy product since the reinforcing field always increases the magnetization. Two, the radial thickness of the permanent magnet can be altered to meet coercive strength requirements and the height (and therefore the area) can be established to meet magnetization requirements necessary to achieve a prescribed flux density at the air-gaps. Three, pole profiling such conical pole faces, permits tailoring the force-displacement characteristic of the device.

FIG. 2 discloses an alternate embodiment of the present invention incorporated in a valve structure. The modified structure includes a plunger 32 of magnetic material which is supported for axial movement on an actuator rod 34. Actuator rod 34 has attached to the lower end thereof a valve body 36 through a sleeve spring 38 which will be described in more detail hereinafter. The housing for the structure is formed by an upper cylindric sleeve 40 and a lower cylindric sleeve 42, both of which are formed of magnetic material and joined to one another at a central seam 44. In the upper end of the housing and attached to the upper end of sleeve 40 is an end flange 46 which is formed of magnetic material and has a central opening in which is supported a magnetic insert 48 which is formed of suitable magnetic material. Insert 48 is centrally bonded to support actuator rod 34 for axial movement within the housing. The lower end of the housing is formed by a lower end flange 50, constructed of suitable magnetic material and centrally bored to support the lower end of the actuator rod for axial movement within the housing. Rigidly mounted within the housing is a radially poled permanent magnet ring 52 in the interior opening of which is supported a cylindric magentic member 56. The axial ends of cylindric magnetic member 56 are excised to receive therein non-magnetic end tubes 58 and 60 which afford rigidity to the structure and form guides for plunger 32. Circumscribing non-magnetic end tube 58 is an electric coil 62 and circumscribing non-magnetic end tube 60 is an electric coil 64. The coils are preferably connected in series. Coil terminal pins 62T and 64T extend through upper flange 46 for effecting connection of the coils to external circuitry.

Attached rigid with lower flange 50 is a valve plate 66 which defines an inlet passage 68 and an outlet passage 70. The inner end of outlet passage 70 defines a valve seat 72 which cooperates with valve body 36 to arrest flow between the inlet and outlet passages when valve body 36 is seated against the seat. For indicating the position of valve body 36 with respect to seat 72, the upper end of the structure includes a mechanism 73 for indicating the position of the valve.

Position indicator 73 includes a pair of Belleville spring washers 74 which are mounted on the upper end of actuator rod 34 by a suitable retaining cap 76. The approximate radial extent of washer 74 is shown by broken lines 75 in FIGS. 2B and 2C. Insert 48 is centrally bored to define a chamber 78 in which the position indicating mechanism is housed. The chamber is closed at the top by an insulative insert 80 which supports terminal pins 82, 84 and 86. The terminal pins are spaced from the center of chamber 78 by an equal amount and are spaced circumferentially uniformally around the insulative insert. The terminals are radially spaced from the center of chamber 78 by a distance greater than the outside diameter of washers 74. The lower ends of the terminal pins are supported by an insulative disc 88 which is suitably mounted in the inner end of chamber 78. The latter insert is bored at 89 to admit the upper end of actuator rod 34 between the two insulative inserts. Mounted on the lower surface of upper insert 80 is a contact 90 which is electrically connected to terminal pin 82. A contact 92 is electrically connected to terminal pin 84.

Mounted on the upper surface of insulative disc 88 is a contact 94 which is electrically connected to terminal pin 82 and a contact 96 that is electrically connected to terminal pin 86. As can be seen in FIGS. 2B and 2C contacts 90, 92, 94 and 96 extend radially inward from the respective terminal pins so that they are contacted by washers 74. When the valve is in an open position, the position shown in FIG. 2, washer 74 bridges contacts 90 and 92 so that the circuit is established between terminal pins 82 and 84. When the valve is closed washer 74 bridges contacts 94 and 96 so that a circuit is completed between terminal pins 82 and 86. Conventional circuitry can be connected to terminal pins 82, 84 and 86 so that electrical response to the position of the valve can be achieved.

As will appear valve body 36 is moved into the closed position against seat 72 by movement of plunger 32 to a downward position against the surface of lower falnge 50. Spring 38 compresses in such position so that tolerances of construction and fabrication are not critical. The spring is formed by a cylinder of suitable spring steel or the like that has the appropriate resiliency characteristic. Pairs of diametrically spaced excisions 98 are formed in the cylinderic wall of the spring, each pair being displaced 90° from the pair axially adjacent thereto. The resultant spring while having sufficient resilience to assure positive closure of the valve has substantial stiffness so that the valve will not bounce even though the entire structure may be subjected to vibrational forces.

Mounting of the device can be accomplished in any suitable way such as by placing the valve in a mating socket formed in a block designated fragmentarily and in phantom in FIG. 2 by reference numeral 100. The socket includes a threaded opening 102, and a threaded ring 104 has corresponding threads so that as the ring 104 is threaded into opening 102 the structure is retained in place. Ring 104 is provided with means for gripping and turning the ring such as spanner wrench openings 15. Depending from the apparatus are two diametrically opposed anti-rotation pins 106 which enter corresponding openings in block 100. Finally, the block is provided with a port 108 that registers with inlet port 68 of the apparatus and a port 110 that registers with the outlet port of the apparatus, a gasket 112 being placed so as to seal the ports.

The operation of the apparatus of FIG. 2 is as follows: With plunger 32 in the position shown in FIG. 2, the plunger is latched in an upward position, corresponding to the open position of valve body 36, by flux produced by permanent magnet 52 which flows as indicated by the broken line through magnetic insert 48, flange 46, and sleeve 40.

In the open position, an electrical circuit path is formed between terminals 82 and 84 so as to give an electrical indication of the position of valve 36. When it is desired to seat valve 36 against seat 72, thereby to interrupt the flow of fluid from inlet port 68 to outlet port 70, a suitable electric pulse is supplied to terminal 62T and 64T. The internal connections of coil 62 and 64 are such that the magnetic field produced in response to energization of coil 62 opposes the flux indicated by the broken line in FIG. 2 so as to neutralize or nullify the latching flux. Simultaneously coil 64 is energized so as to produce an electromagnetic field that adds to the field produced by permanent magnet 52 in a direction that causes plunger 32 to move downward toward lower flange 50. When the plunger reaches its downward most position, valve 36 seats against seat 72, spring 38 is compressed, and the plunger is latched in a lower or closed condition by the flux produced from permanent magnet 52, which flows through cylindric member 56, plunger 32, the lower air gap, lower flange 50, and lower cylindric housing sleeve 42. The valve remains in a closed position even after disconnection of current from terminals from 62T and 64T. When it is desired to open the valve, a current pulse of opposite polarity is applied between terminals 62T and 64T and the latching flux is nullified so that the plunger and valve are raised by the field produced by energization of coils 62 and 64.

Figure 3:
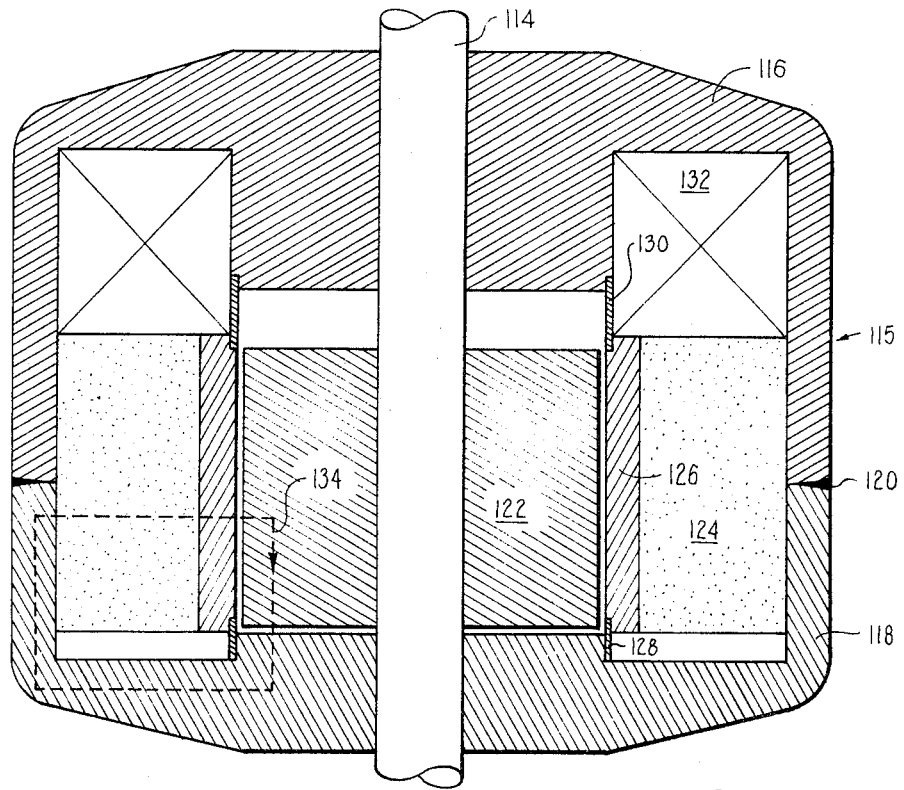
FIG. 3 is a cross-section elevation view of another embodiment of the present invention.

Another embodiment of the invention is shown in FIG. 3, and such embodiment includes an actuator rod 114 which is supported for slidable movement in a central bore of a magnetic housing 115 composed of an upper magnetic member 116 and a lower magnetic member 118. The members are joined to one another at a seam of 120. Attached to actuator rod 114 is a magnetic plunger 122 which is movable from a lower position, as shown in FIG. 3, against magnetic member 118 to an upper position against upper magnet member 116. Fixed within the housing formed by magnetic members 116 and 118 is a radially poled cylindric shaped permanent magnet 124 in the central opening of which is fixed a magnetic cylinder 126, magnetic cylinder 126 has an inner surface which confronts the outer surface of plunger 122. Non-magnetic cylindric guide bushings 128 and 130 are placed at opposite ends of magnetic member 126 to guide plunger 122 throughout its travel and to impart rigidity to the structure. Supported above permanent magnet 124 within upper magnetic housing member 116 is an annular shaped coil 132 which has conventional electrical terminations (not shown) on the exterior of housing 115.

Plunger 122 is latched in the position shown in FIG. 3 by flux that follows a path indicated at 134 in the figure. The flux originates in permanent magnet 124 and traverses magnetic cylinder 126, plunger 122, and magnetic housing number 118. When it is desired to move the plunger 122 upward, coil 132 is energized by supplying power thereto. Because magnetic member 116 has a higher saturation and permeability than magnetic member 118, the force produced by energizing coil 132 is sufficient to overcome the latching flux indicated at 134. When the plunger 132 reaches the upper position, and closes the upper air-gap, the plunger will remain in such position even after removal of power from coil 132 because of the latching flux produced by permanent magnet 124 which traverses magnetic cylinder 126, plunger 122 and upper magnetic housing member 116. When it is desired to effect downward movement of plunger 122, coil 132 is pulsed with a reverse polarity signal which generates a magnetic flux at the upper air-gap that nulls the flux produced by permanent magnet 124 and switches the permanent magnet flux to the lower air-gap thereby generating a net downward force.

Varaitions of the design shown in FIG. 3, include splitting the plunger at its axial mid-plane and connecting actuator rod 114 to the lower plunger section thereby decreasing the required coil current and stroking force without decreasing the latching force and by placing a narrow non-magnetic ring at seam 120 between upper magnetic member 116 and lower magnetic member 118 to alter the latching force.

Figure 4:
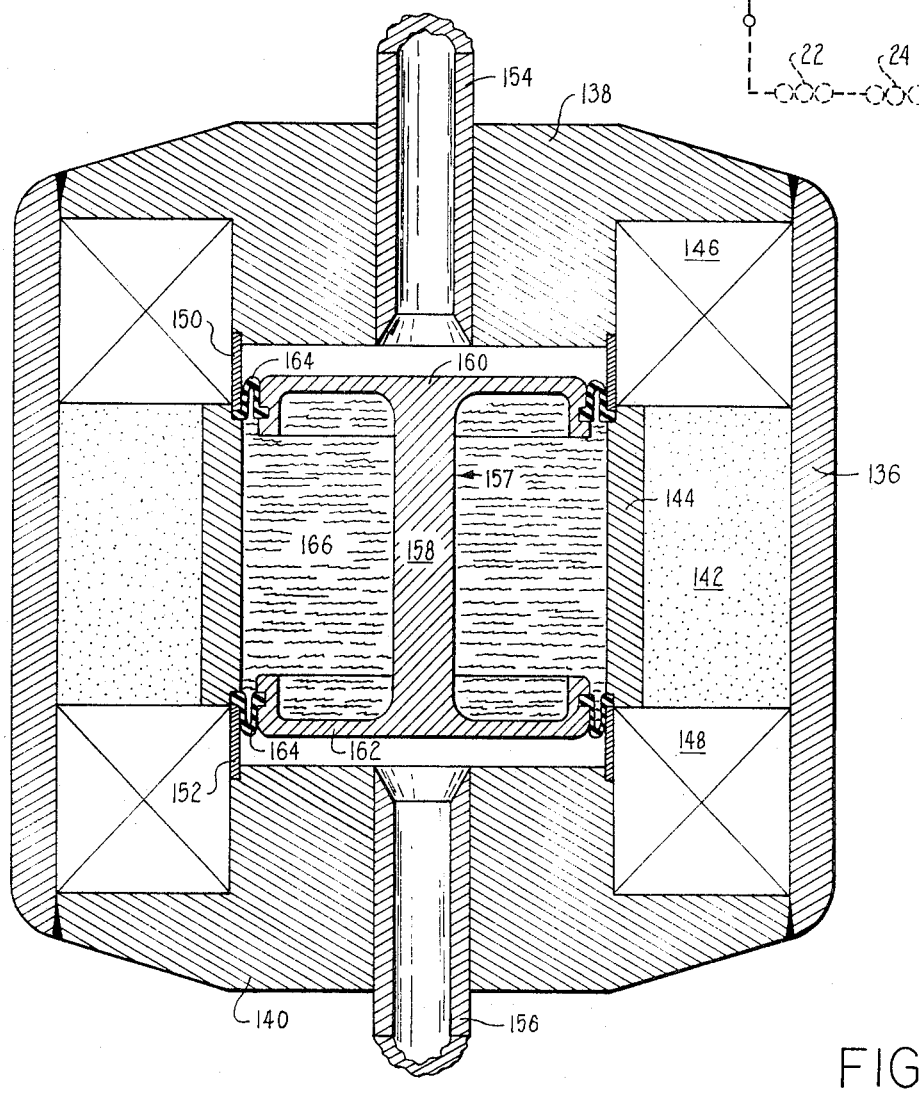
FIG. 4 is an elevation view in cross-section of still another embodiment of the present invention.

Still another embodiment of the invention is shown in FIG. 4. Such embodiment includes a cylindric magentic housing member 136 in the opposite ends of which are fixed magnetic members 138 and 140 which together form magnetic housing for the embodiment. Within the housing is a radially poled cylindric permanent magnet 142 in the center opening of which is fixed a cylindric magnetic sleeve 144. Within magnetic end member 140 is a lower coil 148. Non-magnetic sleeves 150 and 152 span the space between the ends of cylindric sleeve 114 and magnetic end pieces 138 and 140 so as to afford rigidity to the structure and to form a fluid-tight chamber within the structure. A tube 154 communicates with one end of the chamber and a tube 156 communicates with the other end of the chamber. Within the chamber is supported a spool shaped plunger 157 formed by a central spindle 158 on opposite ends of which are cups 160 and 162. Around the periphery of cups 160 and 162 are roll-sock seals 164 which define a fluid tight chamber between end flanges 160 and 162 and cylindrical sleeve 144. Such chamber is filled with ferromagnetic fluid 166 which is typically composed of finely ground ferromagnetic particles suspended in a suitable liquid medium. Thus the fluid functions in a manner equivalent to the solid magnetic plungers referred to in the previously described embodiments.

Although the plunger is shown in the mid-point in FIG. 4, it resides at one or the other extremes of movement, i.e. either with cups 160 against the inner surface of magnetic end piece 140. Energization of coils 146 and 148 nullify the latching flux and cause movement of the plunger to the opposite end in a manner substantially identical to that described above in connection with FIG. 2, for example. Ferromagnetic fluid 166 is contained within the plunger and the plunger is coupled to a load by a fluid which reciprocally flows through tubes 154 and 156. The force output of the ferromagnetic latching actuator of FIG. 4, which is a fluid pressure force, is lower than that for an equally sized solid plunger owing to the lower saturation value of ferromagnetic fluid 166. In addition, the force produced in the ferromagnetic fluid is a body force or fluid pressure. This effect may be used directly to pump ferromagnetic fluids, accomplished by removing roll-sock seals 164 and adding non-magnetic inlet and outlet check valves within tubes 154 and 156.

Figure 5:
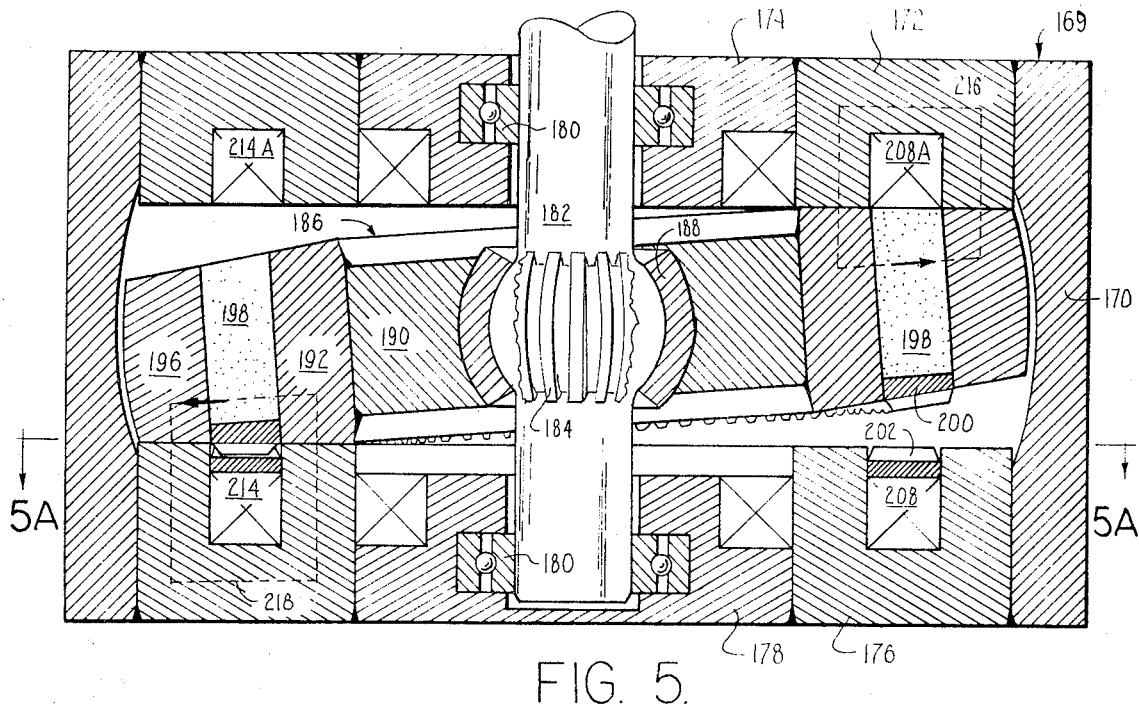
FIG. 5 is an elevation view in cross-section of a rotary actuator according to the present invention.
Figure 5A:
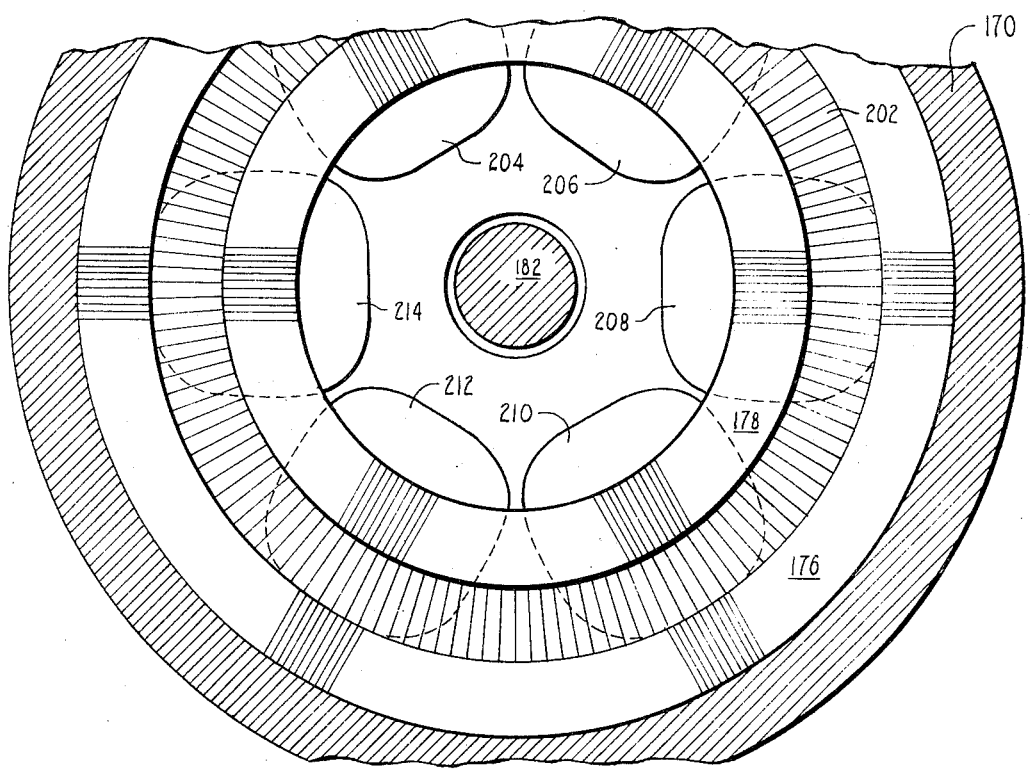
FIG. 5A is a sectional view taken along line 5A—5A of FIG. 5.

The present invention can be embodied in an apparatus which provides stepped rotary motion, an example of such embodiment being shown in FIGS. 5 and 5A. Such embodiment includes a stator housing 169 that is formed by a cylindric magnetic member 170, the upper axial end of which is closed by an outer magnetic member 172 and an inner magnetic member 174, and the lower end of which is closed by an outer magnetic member 176 and an inner magnetic member 178. Inner magnetic members 174 and 178 are centrally bored and support bearings 180 which in turn support a shaft 182 for rotation within the housing. Shaft 180 is provided with spherical splines 184 at a location intermediate inner magnetic end pieces 174 and 178. A rotor 186 has a complementally shaped hub 188 which cooperates with spherical splines 184 to cause shaft 182 and rotor 186 to rotate in unison and to permit the rotor to rock or nutate with respect to shaft 182.

Rotor 186 includes a non-magnetic central portion 190 attached to hub 188, an inner magnetic ring 192 an outer magnetic ring 196, and a ring shaped permanent magnet 198 which is supported between the inner and outer magnetic rings. A non magnetic ring gear 200 is attached to the bottom of permanent magnet ring 198 and cooperates with a second ring gear 202 which is rigid with lower stationary ring 176. As will appear in more detail hereinafter ring gears 202 and 204 have a different number of teeth so that rotor 186 incrementally rotates in response to nutation thereof.

The end members of stator 169 are excised to receive a plurality of annular electric coils, there being in the embodiment shown in FIGS. 5 and 5A twelve such coils, six of which are identified by reference numerals 204, 206, 208, 210, 212 and 214. Corresponding upper coils of equivalent construction and location are in opposition to the lower coils; two of such upper coils appear in FIG. 5 and are designated by reference numerals 208a, and 214a. The above enumerated electric coils are provided with exterior terminations (not shown) for effecting attachment to suitable control circuitry.

It is preferred that nutating gear 200 has a number of teeth that exceeds by 1 the number of teeth on fixed gear 202. By way of example, if nutating gear 200 has 101 teeth, fixed gear 202 has 100 teeth. The consequence of such relationship is that each time rotor 186 wobbles or nutates, it will be advanced 1/100th of a circle.

When no power is supplied to the coils 204-214, 186 assumes a position as shown in FIG. 5 and is there latched by magnetic flux produced by permanent magnet 198. The two latching paths are schematically designated in FIG. 5 by broken lines 216 and 218. It will be noted that the flux path designated by line 216 passes through the center of coil 208A and that the flux path identified by line 218 passes through the center of coil 214.

The operation of the embodiment of the invention shown in FIGS. 5 and 5A can be understood by assuming that coil 208A is pulsed to produce a flux that opposes and nullifies the flux identified by line 216 and that coil 214 is pulsed to produce a flux that opposes and nullifies the permanent magnet flux identified by line 218. Simultaneously, coils 208 and 214 are pulsed in a direction to add to the permanent magnet flux produced by permanent magnet 198, so that rotor 186 will pivot or nutate in a clockwise direction as viewed in FIG. 5. As ring gear 200 meshes with ring gear 202 in a region adjacent coil 208, rotor 186 is incrementally advanced to a position at which the teeth fully mesh. Such incremental advance is transmitted to shaft 182, and the load attached thereto. In order to advance rotor 186 another increment, the same groups of coils are pulsed in opposite polarity whereby rotor 186 pivots or nutates in a counter-clockwise direction as in FIG. 5 and advances shaft 182 another increment. As rotor 186 moves around stator 169, different combinations of coils are pulsed and control circuitry attached or otherwise associated with shaft 182 switches the current supply to the appropriate combination of coils. Thus, it will be seen that by alternately reinforcing and nullifying the flux produced by permanent magnet ring 198, shaft 182 can be caused to advance a precise amount and the shaft will remain in position after termination of all power to the coils because of the latching flux produced by permanent magnet ring 198.

In order to advance shaft 182 through a smaller increment than that referred to in the preceding paragraph, adjacent rathr than diametrically opposed coil pairs can be pulsed. For example, pulsing coils 208A and 214 to null the permanent magnet flux and coils 210A and 204 to reinforce the permanent magnet flux causes rotor 186 to advance an increment one-third that of the above example (the rotor nutates through only 60°, the angular space between adjacent coils).

Figure 6A:
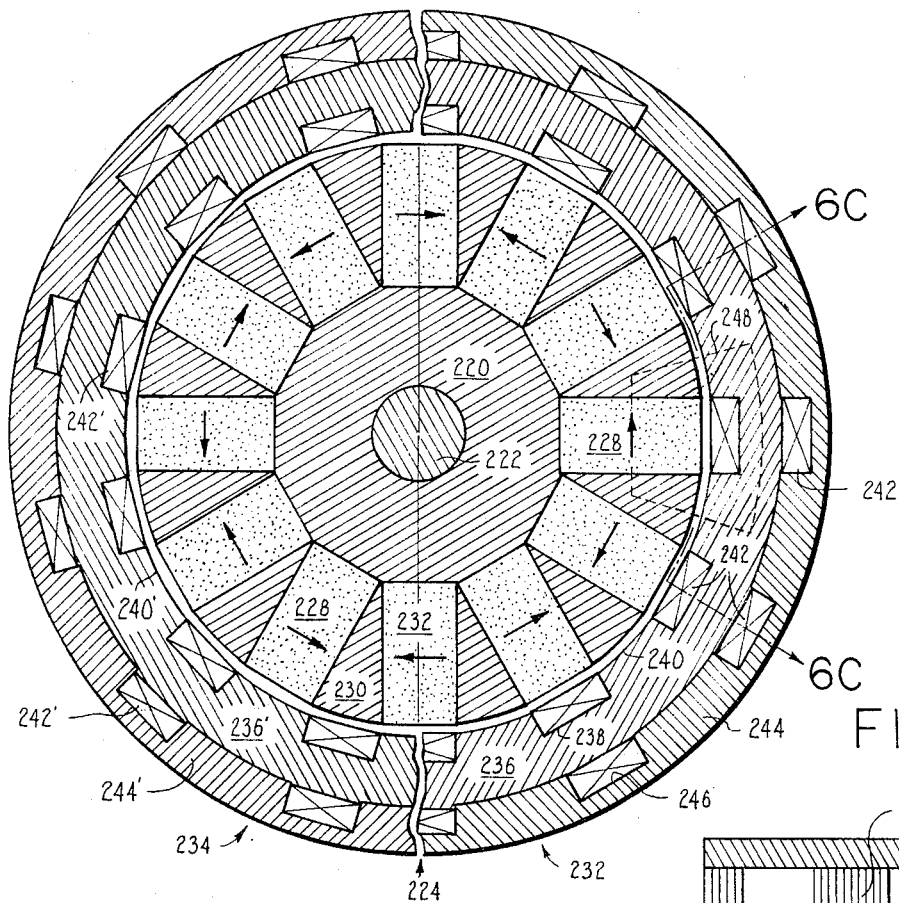
FIG. 6A is a cross-sectional view of another rotary actuator according to the present invention.
Figure 6C:
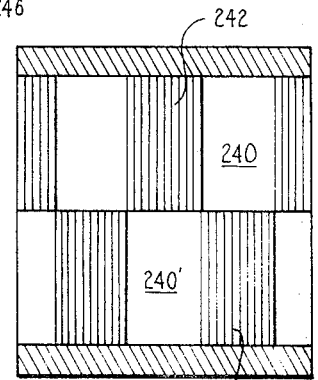
FIG. 6C is a view taken along line C—C of FIG. 6A.
Figure 6B:
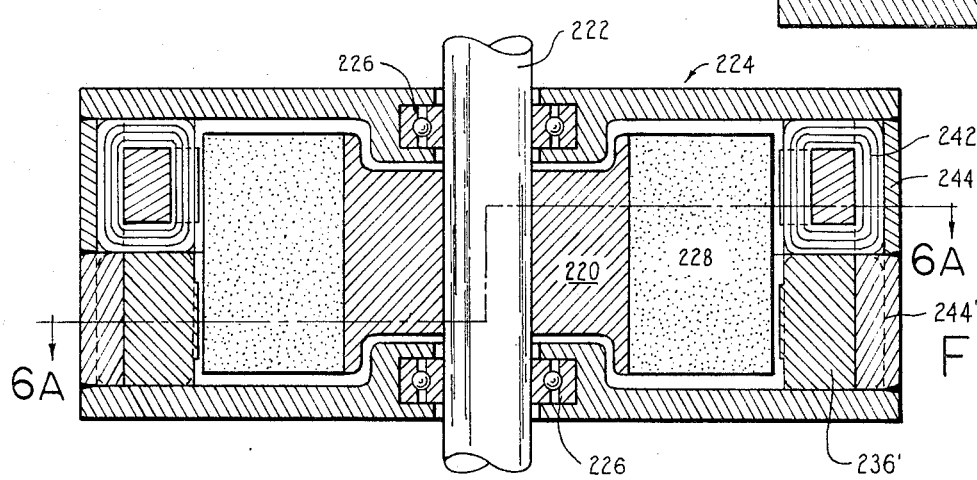
FIG. 6B is a cross-sectional view taken along line B—B of FIG. 6A.

Another version of the invention is shown in FIGS. 6A, 6B and 6C. Such embodiment includes a rotor 220 which is fastened to a shaft 222. Shaft 222 is supported for rotation in a stator housing 224 by means of suitable bearings 226. The rotor 222 includes 12 permanent magnets 228 which are uniformly spaced about the periphery of the rotor and are spaced from one another by wedge shaped magnetic members 230. Arrows 232 indicate the direction in which the permanent magnets are polarized and it will be noted that each magnet is polarized opposite from the two magnets adjacent to it. It will be further noted that the peripheral extent of each magnetic member 230 is equal to the peripheral extent of each permanent magnet 228 so that the rotor has 24 stations of 15° each.

Stator 224 is composed of two sections each of which is equal to approximately one-half the axial extent of permanent magnets 228. The stator sections are indicated generally in FIG. 6A by reference numerals 232 and 234. Each stator section is identical in construction but when they are assembled they are offset circumferentially from one another. Stator 232, for example, includes a magnetic ring 236 on the inner opening of which are twelve uniformly spaced excisions 238. The excisions have a peripheral extent equal to that of permanent magnets 228 in rotor 220. Consequently, between each adjacent excision 238 is a magnetic tooth face 240 which has a 15° extent and cooperates with magnetic member 230 in the rotor to form a latching path. Wound around ring 236 and within each excision 238 is an associated coil 242; an outer magnetic housing 244 has inwardly facing excisions 246 so that the outer magnetic member can be assembled in the position shown in FIG. 6A. Corresponding parts of stator section 234 are identified by the same reference numerals used in conjunction with stator section 232, except that those elements that form a part of stator section 234 are primed. That is to say, stator section 234 is composed of an inner ring 236', an outer ring 244' and a plurality of electric coils 242'. The coils are peripherally spaced from one another by tooth faces 240'.

The embodiment of FIGS. 6A-6C operates as follows:

The rotor is latched in the position shown in the drawings by cooperation between the rotor and stator section 232. The path of the latching flux is indicated by line 248 in the drawing which it will be noted originates from permanent magnet 228 and passes through a wedge shaped magnetic member 230, stator ring 236, another wedge shaped rotor member 230 and back to the permanent magnet. As can be seen in FIG. 6A this magnetic flux path passes through the inner opening of a coil 242. It will be noted on the left side of FIG. 6A, which depicts the relative position between the rotor and stator section 234, that there is a higher reluctance air-gap between wedge shaped rotor members 230 and magnetic stator ring 236' because the wedge shaped members are opposite coils 242'. When it is desired to advance the rotor, all coils 242 are energized so as to oppose and nullify the flux exemplified by line 248. At the same time coils 242' in stator section 234 are energized to add to the flux produced by permanent magnets 228 whereby the rotor advances one step, equal to 15° in the embodiment shown in FIG. 6A. After termination of the current to the coils the rotor will be magnetically latched in its new position by cooperation with the permanent magnets and stator section 234. Repetition of the above procedures advances rotor 220 another increment and between each step the rotor is latched in a position by cooperation of the permanent magnets and the magnetic members in the rotor and in the stator.

Figure 7:
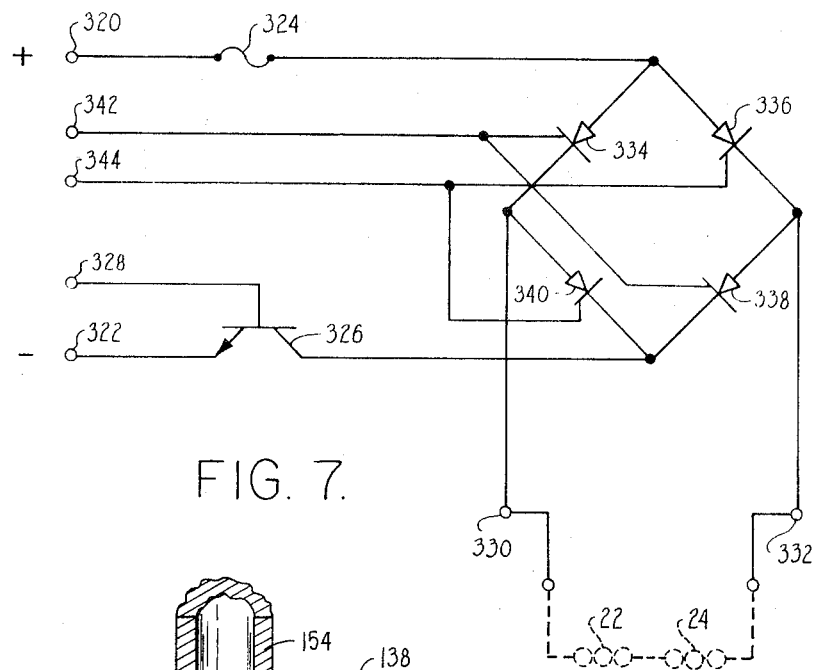
FIG. 7 is a schematic diagram of an electric control circuit suitable for controlling the actuators of the present invention.

The circuitry for energizing the coils employed in the various embodiments described hereinabove, can take many forms. A suitable current source is shown in FIG. 7. The circuit includes a positive power input terminal 320 and a negative power input terminal 322 which are connected to any suitable direct current power source. A conventional fuse 324 is provided for protecting the circuit and the actuator to which it is connected from overloads. In series with one of the input leads, e.g., that connected to negative input terminal 322, is a power transistor to 326 the base or trigger lead of which is connected to a terminal 328. The output of the circuit is connected to output terminals 330 and 332. Such terminals are connected to opposite corners of a bridge circuit formed by four SCR's 334, 336, 338 and 340. The trigger electrodes of SCR's 334 and 338 are commonly connected to a control terminal 342 and the trigger terminals of SCR's 336 and 340 are commonly connected to a terminal 344. When the circuit of FIG. 7 is employed to control the embodiment of the invention shown in FIGS. 1A-1D, coils 22 and 24 are connected in series between output terminals 330 and 332.

The operation of the circuit of FIG. 7 in conjunction with the embodiment of the invention shown in FIG. 1A is as follows: With DC power connectted to input terminals 320 and 322, a bias is applied to one or the other of input terminals 342 and 344, for example, input terminal 342. This causes SCR's 334 and 338 to conduct. Trigger terminal 328 is then pulsed for a suitable duration and the positive side of the DC power source is thereby switched to terminal 330 and the negative side of the power source is switched to output terminal 332. Accordingly the coils 22 and 24 are energized so that one opposes and nullifies the latching flux afforded by the permanent magnet and the other enhances or is added to such flux. In consequence of this, the moving part of the actuator is switched to the opposite position. Thereafter, the control signal is disconnected from input terminal 342 and connected to terminal 344 and when another actuation of the actuator is required, a suitable pulse is supplied to control terminal 328. With a circuit in this configuration, the positive side of the DC power source is connected to output terminal 332 and the negative side is connected to output terminal 330, whereupon the actuator returns to the original position.

Thus it will be seen that the present invention provides an extremely simple and efficient electromagnetic latching actuator. The actuator is capable of extremely high forces without undue consumption of power. Moreover, the actuator is passively latched in a given position without consuming any power from exterior sources because, in each case, the permanent magnet is poled in such a direction that the magnetic length thereof is less than the square root of the cross section of the magnetic path across which the flux is active. The invention can be incorporated into reciprocating, rotary, or other forms of mechanical linkages without sacrificing the advantages alluded to hereinabove.

Although several embodiments of the invention have been shown and described, it will be obvious that other adaptations and modifications can be made without departing from the true spirit and scope of the invention.

What is claimed is:

1. In an actuator of the type that has a housing and a driving element supported in said housing for movement between a first position and a second position, an improved system for controlling the movement and position of said element with respect to said housing, said system comprising a first magnetic member attached to the driving element, a second magnetic member rigid with said housing and arranged to form a magnetic circuit path with said first magnetic member, said magnetic circuit having a vairable reluctance first air-gap therein between said first and second magnetic members which first air-gap is relatively small in said first position, a permanent magnet interposed in said magnetic circuit path to establish in said magnetic circuit path a latching flux for latching said driving element in said first position relative to said housing, said permanent magnet having a magnetic length along the circuit path that is less than the square root of the transverse area of the circuit path, at least one electric coil fixed within said housing circumscribing at least one of said magnetic members, said coil producing a magnetic flux in resonse to electrical excitation thereof that opposes and nullifies the latching flux produced in said magnetic circuit by said permanent magnet to permit movement of said driving element relative to said housing away from said first position thereby to increase the reluctance of said first air-gap, and a third magnetic member spaced from said second magnetic member and corresponding to said second position and being arranged to form with said permanent magnet and said first magnetic member a second latching flux path for latching said driving element in said second position.

2. An actuator according to claim 1 wherein said permanent magnet is attached to first magnetic member for movement therewith.

3. An actuator according to claim 1 wherein said permanent magnet is attached to said housing and said second magnetic member.

4. An actuator according to claim 1 wherein said permanent magnet is of annular form and defines a central opening and wherein said first magnetic member has a shape substantially similar to said opening and resides therein to define a low reluctance path therebetween.

5. In an electromagnetic latching actuator of the class having permanent magnet means for producing magnetic flux in at least two variable reluctance parallel magnetic circuits, electric coil means for switching said permanent magnet flux between said magnetic circuits, a movable high permeability element that flux links said magnetic circuits and that is moved by said flux switching so as to vary reluctance in said magnetic circuits, and means for attaching movable objects to said movable element, the improvement comprising means forming at least two variable reluctance magnetic circuits with variable air-gaps in which a permanent magnet having a short magnetic length and a large magnetic area is in series with said magnetic circuits, at least one electric coil means which alternately switches the permanent magnet induced flux between said magnetic circuits by being energized with alternating electrical voltage polarity without switching flux direction in the permanent magnet, and a movable high permeability element that flux links said magnetic circuits and that is moved by said flux switching so as to increase the reluctance of the magnetic circuit to which it was latched to and to decrease the reluctance of the magnetic circuit toward which it is attracted and subsequently latched to with said latching provided solely by the permanent magnet induced flux so that said movable element with said attached movable objects is unlatched from one position and is attracted to and passively latched at another position.

6. An electromagnetic latching actuator in accordance with claim 5 comprising two parallel magnet circuits with variable air-gaps in which a radially poled toroidal permanent magnet having a short magnetic length and a large magnetic area is in series with said magnetic circuits, an electric coil for each magnetic circuit which alternately switches the permanent magnet induced flux between said magnetic circuits without switching flux direction in the permanent magnet, the two electric coils being series energized with alternating voltage polarity, a movable high permeability element that flux links said magnetic circuits and that is moved by said flux switching so as to increase the reluctance of the magnetic circuit too which it was latched to and to decrease the reluctance of the magnetic circuit toward which it is attracted and subsequently latched to with said latching provided solely by the permanent magnet induced flux.

7. An electromagnetic latching actuator in accordance with claim 6 in which the permanent magnet is integral with the movable high permeability element.

8. An electromagnetic latching actuator in accordance with claim 6 in which the permanent magnet is integral with the common segment of the two stationary parallel magnetic circuits.

9. An electromagnetic latching actuator in accordance with claim 5 comprising two parallel magnetic circuits with variable air-gaps in which a radially poled toroidal permanent magnet having a short magnetic length and a large magnetic area is in series with said magnetic circuits, an electric coil mounted in one magnetic circuit hich alternately switches the permanent magnet induced flux between said magnetic circuits without switching flux direction in the permanent magnet, a movable high permeability element that flux links said magnetic circuits and that is moved by said flux switching so as to increase the reluctance of the magnetic circuit to which it was latched and to decrease the reluctance of the magnetic circuit toward which it is attracted and subsequently latched to with said latching provided solely by the permanent magnet induced flux.

10. An electromagnetic latching actuator in accordance with claim 5 comprising a stator including at least three pairs of variable reluctance parallel magnetic circuits arranged in a circular array with each said circuit pair having two electric coils with one coil of each said circuit pair mounted in a planar circumferential circular array and with the second coil of each said circuit pair colinear with said first coil and mounted in a planar circumferential circular array parallel to and concentric with the first planar circular array but separated by a fixed axial distance wherein fixed axial distance is maintained by an annular ring of high permeability material and a rotor including a radially poled permanent magnet segment having a short magnetic length and a large magnetic area and means attached to said permanent magnet for forming a common return magnetic circuit in series with said magnetic circuit pairs and within said fixed axial distance, said rotor being in the form of a nutating wheel that acts as the movable high permeability element which is splined to and nutates about a splined shaft whose axis is normal to plane of said circular array, so that said wheel nutates in response to the sequential energization of diametrically opposite said electric coils so as to nutate said nutating wheel thereby rotating said output shaft.

11. An electromagnetic latching actuator in accordance with claim 10 in which said nutating wheel has a toothed flange and said stator has a gear thereby forming a nutating gear which nutates by engaging said wheel with said gear, said gear being coplanar to said circular array and said gear having a different number of teeth than said nutating wheel.

12. An electromagnetic latching actuator in accordance with claim 5 comprising a stator that includes first and second substantially identical sections, each said section including a toothed ring having inward extending teeth that are of uniform circumferential extent and are spaced from one another by an equal extent to define a space between each tooth that is equal in circumferential extent to that of the tooth, an electric coil disposed in each space and circumscribing the ring so that a magnetic path between adjacent teeth passes through the portion of the ring that is circumscribed by said coil, said first and second stator sections being joined to one another so that the coils of first section reside in axial alignment with the teeth in the second section, and a rotor supported for rotation within the toothed rings of said stator, said rotor having a plurality of permanent magnets at the periphery thereof, said permanent magnets each having a circumferential extent equal to that of the teeth on said stator and an axial extent at least as great as that of the combined stator sections, a magnetic wedge shaped spacer between each said permanent magnet, said spacer having a circumferential extent equal to that of the permanent magnets and the teeth, so that opposite energization of the coils in the first stator section and the coils in the second stator sections causes rotation of said rotor by an increment equal to the circumferential extent of the teeth.

13. An actuator in accordance with claim 5 in combination with a valve body, means for connecting the valve body to said moveable element, a valve seat mounted in alignment with said valve body and positioned with respect thereto so that the valve body is latched against said seat at one position of the actuator and latched in spaced apart relation to the seat in the other position of the actuator.

14. An actuator according to claim 13 wherein said valve body connecting means comprises a tubular resilient member, said tubular member having a plurality of diametrically opposed pairs of excisions, the excisions of adjacent pairs being circumferentially offset from one another.

15. An actuator according to claim 13 in combination with a rod attached to said moveable element, a conductive spring washer attached to said rod, a first pair of contacts disposed so as to be bridged by said spring washer at one position of said actuator and a second pair of contacts disposed so as to be bridged by said spring washer at the other position of said actuator.

16. An actuator according to claim 5 in combination with a rod attached to said moveable element, a conductive member attached to aid rod, a first pair of contacts disposed so as to be bridged by said conductive member at one position of said actuator and a second pair of contacts disposed so as to be bridged by said conductive member at the other position of said actuator.

* * * * *